April 12, 1960  Y. J. LUBKIN  2,932,818
ACOUSTIC MATERIAL SENSING APPARATUS
Filed March 19, 1957
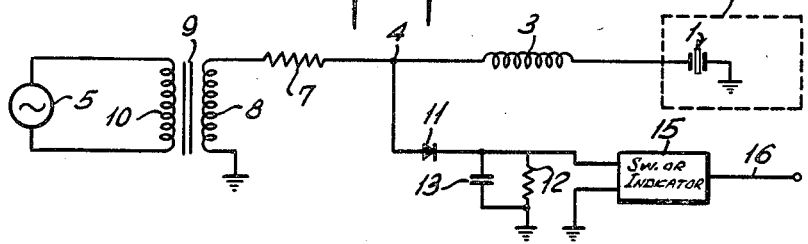
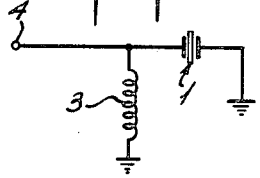
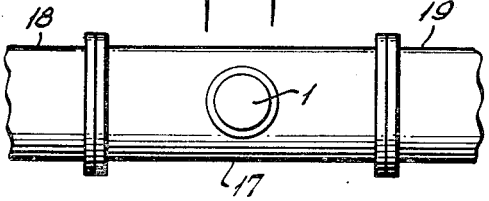
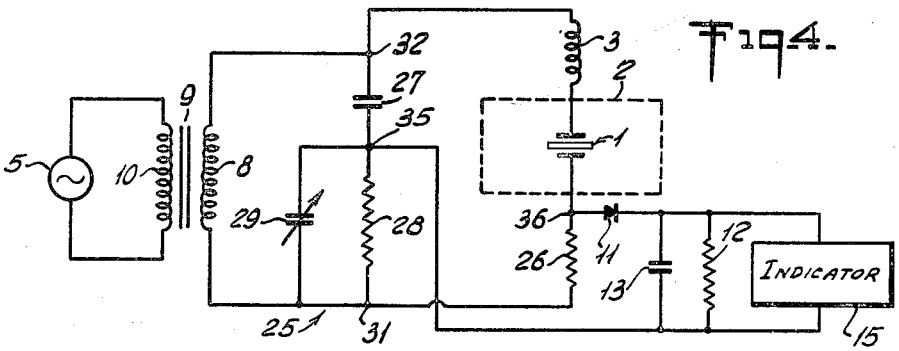
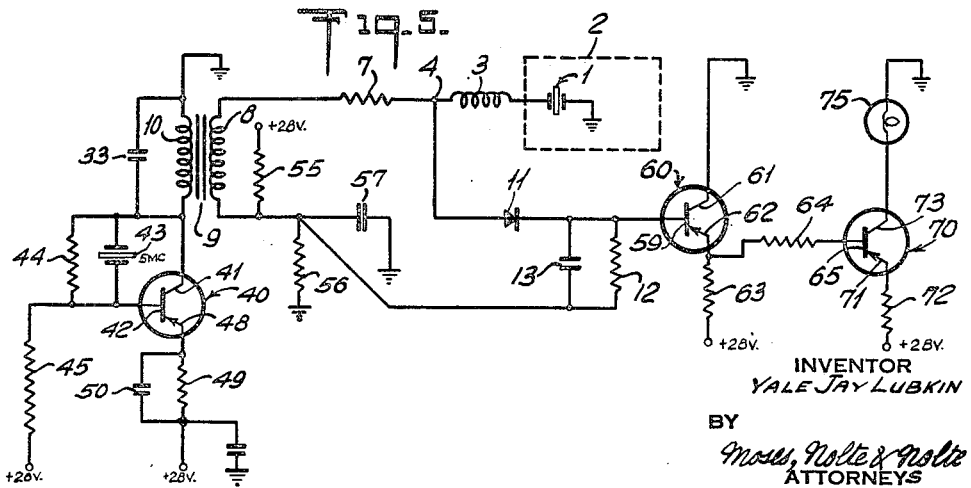
INVENTOR
YALE JAY LUBKIN
BY
Moses, Nolte & Nolte
ATTORNEYS United States Patent Office 2,932,818
Patented Apr. 12, 1960

2,932,818
ACOUSTIC MATERIAL SENSING APPARATUS

Yale Jay Lubkin, Jackson Heights, N.Y., assignor to The W. L. Maxson Corporation, New York, N.Y., a corporation of New York Application March 19, 1957, Serial No. 647,149

10 Claims. (Cl. 340—244)

The present invention relates to an apparatus for indicating the nature of the material with which it is in contact in so far as the nature of the material can be determined from the acoustic impedance thereof.

It is desirable in many technological applications to determine the presence or absence of a particular material at a particular point. For example, in a liquid fuel supply system or other fluid system, it may be desirable to determine when the supply tank is empty, or when the liquid level has dropped below a certain point, or to determine or indicate when there is no liquid or fuel in a pipe line or other parts of a liquid supply system. Accordingly, it is an object of the present invention to provide a very simple, light-weight, inexpensive reliable means for positively indicating the presence or absence of a particular material at a particular point in a system.

It is another object of the invention, to sense the presence of any of several materials having different acoustic impedances.

Still another object of the invention is to determine whether a liquid is at a predetermined level or below that level.

A still further object of the invention is to provide a positive indication of whether a liquid is flowing through a supply system.

The objects of the invention are achieved by bringing a piezoelectric crystal into acoustic contact with the material to be sensed. The crystal is energized at one of its resonant frequencies. The crystal is preferably resonated by an inductance connected thereto. An indicator is provided, such as a lamp, which is adapted to give "off" and "on" indications depending on the presence or absence of a particular material which, when present, is in acoustic contact with the crystal. When, for example, the liquid is replaced by a gas, the voltage across the crystal changes by a discrete sensible amount. A circuit is connected between the crystal and the indicator for supplying a sufficient current or voltage to the indicator to reverse an "off" or "on" condition when said voltage change occurs across the crystal. One particular application of the apparatus would be in a system in which a liquid fuel is pumped by gas pressure. When the crystal is placed at an appropriate point in the fuel system, the apparatus will indicate a change of state at that point from liquid fuel to the gas propellent, and thus can be used to indicate when the fuel tank has become empty.

The above objects and other objects and advantages of the invention will be apparent, and the invention will be fully understood from the following description and drawings in which:

Fig. 1 is a schematic diagram of one embodiment of the invention;

Fig. 2 is a detail view showing a modification of the crystal circuit;

Fig. 3 is a partial view showing a crystal mounting;

Fig. 4 is a schematic circuit diagram of another embodiment of the invention; and Fig. 5 is a schematic circuit diagram of still another embodiment of the invention.

Referring to Fig. 1, the piezoelectric crystal 1 is provided with a mounting such that it can be brought into acoustic contact with the material, such as a liquid, which is sensed. The crystal may, for example, be mounted inside a container or on a wall of a container or pipe or other receptacle, or the mounting of the crystal may be otherwise arranged so that one face or both faces of the crystal are brought into acoustic contact with the liquid. One side of the crystal which is in contact with the liquid, is effectively grounded therethrough. The crystal is connected in series with an inductor 3 and resistor 7 and the secondary winding 8 of a transformer 9. The primary winding 10 of the transformer is connected to a source of oscillations 5 having a frequency substantially equal to one of the resonant frequencies of the crystal. Inductor 3 is dimensioned so that its reactance at the resonant frequency of the crystal is substantially equal in magnitude but opposite in sign to the reactance of the crystal and its mounting. The crystal is preferably of the X-cut type. A point 4 between the inductor 3 and resistor 7 is connected to a rectifier 11 and a filter circuit. The filter circuit as here shown, consists simply of a resistor 12 and a condenser 13. A switching or indicating circuit 15 which may include a switching transistor, or relay, or lamp or other device is connected across the filter circuit and the switching or indicating circuit may have a suitable output 16 to any other apparatus which may be operated thereby.

Referring to Fig. 2, there is shown a modification in which the inductor 3 is connected in parallel with the crystal 1. Although it is preferred that the inductor have a reactance equal and opposite to that of the crystal and its mounting, it may in some instances, have a different reactance. Further, the resistor 7 (Fig. 1) may be replaced by a suitable impedance.

Fig. 3 schematically shows the crystal 1 mounted in a pipe section 17 which interconnects pipes 18 and 19. The pipes may be part of a pipe line supplying a liquid, such as a liquid fuel. When the liquid is being pumped through the pipe line, crystal 1 will be in contact with the liquid. If the fuel path should become empty, or if the liquid should disappear from pipe line for any other reason, the inner face of the crystal would be exposed to a gas, which would replace the liquid. The acoustic impedance presented to the crystal would then change and the voltage developed across the crystal would change accordingly by a sufficient amount to operate the switching or indicating circuit 15 of Fig. 1 and thus show that the liquid or fuel supply has failed.

Referring to Fig. 4, the crystal 1 is connected in a Schering bridge circuit 25. The crystal may be mounted in or associated with a suitable receptacle 2 permitting a particular material such as a liquid to be placed in acoustic contact with one or both faces of the crystal. The bridge circuit consists of one arm including the crystal 1 in series with inductor 3 and resistor 26 and a second arm, in parallel with the first arm, consisting of a capacitor 27 and a resistor 28 in parallel with an adjustable condenser 29. The secondary winding 8 of the transformer 9 is connected between points 31 and 32 of the bridge and is coupled to an oscillator 5 by way of the secondary winding 10 of the transformer. Here again the oscillator 5 is preferably tuned to the same frequency as crystal 1. The output circuit is connected between points 35 and 36 of the bridge and may consist of a rectifier 11, a filter circuit 12, 13 and an indicating or switching circuit 15 similar to that described in connection with Fig. 1. The bridge may be balanced by adjustment condenser 29 when a particular material is in contact with crystal 1, so that no voltage appears between points 35 and 36 of the bridge. When the material in contact with the crystal is replaced by another material having a different acoustic impedance, as when a liquid is replaced by a gas, a high frequency voltage of a definite magnitude will appear between points 35 and 36 of the bridge. This voltage will be rectified by rectifier 11 and filtered by circuit 12, 13 in order to supply rectified current to the switching or indicating circuit 15. The indicating circuit may include a lamp which will light to indicate the change in material which has occurred in crystal 1. A null detector may be connected between points 35 and 36 and the shaft position of condenser 29 when the bridge is balanced will give the required indication.

Fig. 5 shows a more detailed circuit diagram of an arrangement similar to that of Fig. 1. For the sake of definiteness only representative values of the various circuit elements have been indicated. Here again, crystal 1 is associated with a suitable receptacle 2 adapted to bring at least one face of the crystal into acoustic contact with the materials to be sensed. The crystal is connected in series with an inductor 3 and a stable resistor 7 through a secondary winding 8 of a transformer 9 having a primary winding 10. The primary winding is shunted by a condenser and one end thereof is effectively grounded. The oscillator includes a transistor 40 having its collector electrode 41 and base electrode 42 interconnected to a crystal 43 which may be resonant to a frequency of five megacycles. The crystal is in shunt with resistor 44. A positive voltage of 28 volts is impressed on the base electrode through a resistor 45 and the same voltage is applied to emitter electrode 48 through a resistor 49 in parallel with condenser 50. Thus the circuit of transistor 40 is a five megacycle crystal controlled oscillator.

The lower end of secondary winding 8 is connected to +28 volts through resistor 55 and is grounded through resistor 56 and condenser 57. The point 4 between inductor 3 and resistor 7 is connected through rectifier 11 to the base electrode 59 of transistor 60. The output of rectifier 11 is filtered by a resistor 12 in parallel with condenser 13 connected between the rectifier and the lower end of secondary winding 8. The collector electrode 61 is grounded, while emitter electrode 62 is connected to +28 volts through resistor 63. The emitter electrode 62 is also coupled to base electrode 65 through a resistor 64. Transistors 60 and 70 form a two-stage D.C. amplifier. The +28 volts source is also applied to emitter electrode 71 of transistor 70 through resistor 72, while collector electrode 73 is grounded through a pilot lamp 75. When the material to which crystal 1 is exposed changes from a gas to a liquid, the voltage across crystal 1 and inductor 3 changes sufficiently to cause lamp 75 to light and thus signal that a change of material has occurred at crystal 1, that is, within the receptacle 2.

The theory of the invention will be understood from the following considerations:

If an X-cut piezoelectric crystal is operated at its resonant frequency, and if at least a portion of the crystal is maintained in contact with a medium of acoustic impedance $pv$, then the equivalent circuit of the crystal is a capacitance, whose value is equal to the static capacitance across the faces of the crystal, in series with a resistance whose value is given by the expression $K/(pv+C)$, where K is a constant whose value depends on the nature of the crystal and upon its dimensions, $pv$ is the acoustic impedance of the medium, the product of the density, $p$, and the velocity of sound in the medium, $v$, and C is a constant whose value depends primarily on the means of mounting the crystal and of making contact to the conductive coatings on the faces of the crystal. For other crystal cuts, the equivalent circuit at resonance is a different RC network. For a Y cut crystal, for instance, it is a parallel RC combination, where the capacitance is equal to the static capacitance across the faces of the crystal. If it is desired to know in which of a number of classes, M, the material in contact with the piezoelectric crystal belongs, and if the aforementioned classes can be put into correspondence with classes, I, having acoustic impedances as a differentiating factor, then selection among the classes M is equivalent to selection among the classes I. Selection among the classes I can then be made on the basis of selection of various ranges of the equivalent series resistance of the piezoelectric crystal. For illustration, the acoustic impedance of gases at one atmosphere is of the order of 400 kg./m.$^2$-sec. and is roughly proportional to pressure; the acoustic impedance of liquids, exclusive of mercury, and liquified gases is in the range of 630,000 kg./m.$^2$-sec (pentane, 20° C.) to 3,250,000 (methyleneiodide, 24° C.); and the acoustic impedance of metals in the range of 8,100,000 kg./m.$^2$-sec. (magnesium) to 104,200,000 kg./m.$^2$-sec. (tungsten). Thus gases, metals and fluids can be divided into well defined acoustic impedance classes. As another illustration, the acoustic impedance of water varies from 1,400,000 to 1,530,000 kg./m.$^2$-sec., whereas the acoustic impedance of light oils (kerosene) is a maximum of about 1,200,000 from 0° C. to 100° C., so that water and light oils may be put into separate acoustic impedance classes.

An X-cut quartz crystal, with a resonant frequency of 5 megacycles, and a diameter of 0.300 inch, operated at its resonant frequency, will have an equivalent series resistance, when one face is immersed in liquid oxygen of 1000–1450 ohms and an equivalent series capacitance of approximately 3.25 micromicrofarads. The same crystal, with reasonably well designed mounting arrangements, will have an equivalent series resistance greater than, say 7000 ohms, when both sides of the crystal are immersed in gas. The crystal and its mounting, may have an equivalent series capacitance of about 6 micromicrofarads and an equivalent series resistance of approximately 300–500 ohms when one side of the crystal is immersed in liquid oxygen and at least greater than, say 2500 ohms when both sides of the crystal are immersed in a gas. Suppose the resistance of the resistor 7 is 1000 ohms. Suppose also that the oscillator and coupling network produce a substantially constant voltage across the series connection of the crystal, inductor, and resistor, say 10 volts. Then, when one face of the densitometer crystal is immersed in liquid oxygen, the maximum voltage appearing across the series connection of the inductor (which here has been assumed to have an equivalent resistance small compared to 500 ohms) and the crystal will be at most 3.3 volts; and when both faces of the crystal are immersed in a gas, the voltage across the series connection of inductor and densitometer will be at least 7.0 volts. The rectifier 11, filter 12, 13 and indicator 15, or transistors 60 and 70 of Fig. 5, are arranged so that they can differentiate between a condition of less than 3.3 volts and greater than 7.0 volts, and then the output of the indicator can be used to indicate, for instance, the point in time when the liquid oxygen at a given point in a fueling system has been replaced by a gas, i.e., when the liquid oxygen tank has emptied.

I have shown and described several embodiments of my invention for illustrative purposes. It will be understood by those skilled in the art, that many variations and modifications may be made without departing from the spirit and scope of my invention as defined in the following claims.

I claim:

1. Apparatus for detecting the presence or absence of a particular material comprising a piezoelectric crystal, means for mounting said crystal so that at least one face thereof is exposed for acoustic contact with said material, an impedance connected in series with said crystal, means connected in series with said crystal and said impedance for energizing said crystal with fixed frequency electrical waves at one of the resonant frequencies of the crystal, signaling means adapted to be actuated by a current of predetermined magnitude, and circuit means connecting a point between said impedance and said crystal to said signaling means for supplying said predetermined current to said signaling means in response to a predetermined voltage across said crystal resulting from acoustic contact of the crystal with said material.

2. Apparatus according to claim 1, including an inductor connected in series between said point and the crystal, said inductor having a reactance substantially equal in magnitude and opposite in sign to that of the crystal at the resonant frequency of the crystal.

3. Apparatus according to claim 1, wherein the crystal is an X-cut crystal.

4. Apparatus according to claim 1, including an inductor connected in parallel with the crystal.

5. Apparatus according to claim 1, wherein said circuit means includes a rectifier and a filter network connected in series between said point and ground, said signaling means being connected across said filter network.

6. Apparatus according to claim 5, wherein said signaling means includes a transistor amplifier having an input circuit connected across said filter and an output circuit including a lamp adapted to be lit by said predetermined current.

7. Apparatus according to claim 6, wherein said energizing means includes an oscillator circuit comprising a transistor and a second piezoelectric crystal connected between a pair of electrodes of said transistor, and means for coupling the oscillator circuit to the first mentioned crystal, said first and second crystals being resonant to the same frequency.

8. Apparatus according to claim 1, including a liquid conducting pipe, said crystal is mounted in a wall of said pipe.

9. Apparatus for detecting the presence or absence of a particular material comprising a Schering bridge having a piezoelectric crystal mounted in one arm thereof, means for mounting said crystal so as to expose at least one face thereof to acoustic contact with said material, means coupled to said bridge circuit for impressing thereon fixed frequency electrical waves for energizing said crystal at one of its resonant frequencies, said bridge having a second arm in parallel with the first mentioned arm of the bridge, signaling means adapted to be actuated by a current of a predetermined magnitude, and circuit means connected across intermediate points of the first and second arms of the bridge for supplying said predetermined current to said signaling means in response to a removal of said material from acoustic contact with the crystal.

10. Apparatus according to claim 9, wherein an inductor is connected in series with said crystal in said one arm of the bridge, the reactance of the inductor being equal in magnitude and opposite in sign to the reactance of the crystal.

References Cited in the file of this patent

UNITED STATES PATENTS

| | | |
|---|---|---|
| 2,105,479 | Hayes | Jan. 18, 1938 |
| 2,808,581 | Findlay | Oct. 1, 1957 |